United States Patent [19]

Mock

[11] Patent Number: 5,381,935

[45] Date of Patent: Jan. 17, 1995

[54] CLOSURE UNIT FOR A CONTAINER HAVING A HINGED CONSTRUCTION, MADE OF DIFFERENT MATERIALS AND HAVING A FILM WHICH TEARS ON FIRST OPENING

[75] Inventor: Elmar Mock, Biel/Bienne, Switzerland

[73] Assignee: Tetra Laval Holdings & Finance S.A., Pully, Switzerland

[21] Appl. No.: 986,911

[22] Filed: Dec. 8, 1992

[30] Foreign Application Priority Data

Dec. 12, 1991 [CH] Switzerland ............ 03681/91
Dec. 12, 1991 [CH] Switzerland ............ 03682/91
Dec. 12, 1991 [CH] Switzerland ............ 03683/91
Dec. 12, 1991 [CH] Switzerland ............ 03685/91

[51] Int. Cl.⁶ .............................. B65D 47/10
[52] U.S. Cl. ........................ 222/541; 222/556
[58] Field of Search ............... 222/541, 556; 229/123.3, 125.02, 125.08, 125.11, 125.14, 125.15; 220/338

[56] References Cited

U.S. PATENT DOCUMENTS

| | | | |
|---|---|---|---|
| 3,443,005 | 5/1969 | Braun | 264/245 |
| 3,917,789 | 11/1975 | Heisler | 264/219 |
| 3,964,609 | 6/1976 | Perella | 220/338 |
| 4,082,201 | 4/1978 | Bittel | 220/339 |
| 4,171,749 | 10/1979 | Obrist et al. | 222/541 |
| 4,391,385 | 7/1983 | Rausing | 220/307 |
| 4,397,401 | 8/1983 | Ueno et al. | 220/260 |
| 4,402,435 | 9/1983 | Libit | 222/556 |
| 4,462,504 | 7/1984 | Roth et al. | 222/153 |
| 4,669,640 | 6/1987 | Ando et al. | 222/556 |
| 4,711,372 | 12/1987 | Gach | 222/23 |
| 4,735,335 | 4/1988 | Torterotot | 220/359 |
| 4,742,928 | 5/1988 | Braun | 222/556 |
| 4,770,325 | 9/1988 | Gordon et al. | 222/541 |
| 4,795,065 | 1/1989 | Ashizawa et al. | 220/541 |
| 4,858,793 | 8/1989 | Stone | 222/541 |
| 4,887,747 | 12/1989 | Ostrowsky et al. | 222/556 |
| 4,892,217 | 1/1990 | Shastal | 222/541 |
| 4,949,882 | 8/1990 | Take | 222/541 |
| 4,986,465 | 1/1991 | Jacobsson et al. | 229/123.3 |
| 4,988,012 | 1/1991 | Shastal | 220/258 |
| 5,054,641 | 10/1991 | Sato | 220/270 |
| 5,062,542 | 11/1991 | Morton | 220/269 |
| 5,065,911 | 11/1991 | Rohr et al. | 222/556 |
| 5,197,618 | 3/1993 | Goth | 215/232 |
| 5,251,793 | 10/1993 | Bolen, Jr. et al. | 222/556 |

FOREIGN PATENT DOCUMENTS

| | | |
|---|---|---|
| 0079676 | 10/1982 | European Pat. Off. . |
| 0224593 | 5/1986 | European Pat. Off. . |
| 0268690 | 6/1987 | European Pat. Off. . |
| 0316269A1 | 5/1989 | European Pat. Off. . |
| 2647088 | 11/1990 | European Pat. Off. . |
| 1941479 | 8/1969 | Germany . |
| 2636259 | 8/1976 | Germany . |
| 61-47223A | 8/1984 | Japan . |
| WO84/00531 | 2/1984 | WIPO . |
| WO90/14287 | 11/1990 | WIPO . |

*Primary Examiner*—Andres Kashnikow
*Assistant Examiner*—Philippe Derakshani
*Attorney, Agent, or Firm*—Frishauf, Holtz, Goodman & Woodward

[57] ABSTRACT

The inventive closure unit has a hinge (4), which pivotally interconnects the pouring part (1) and the closure part (2). The hinge (4) comprises at least one bearing part and a pivot part pivotally mounted on the bearing pan. The closure unit is produced according to a multimaterial injection molding process, in such a way that the beating parts are made from one material and the pivot parts from another. As a result of the good matching of such materials molded on one another the pairs of beating surfaces are also tight, so that the hinge (4) can take over part of the sealing function between the pouring pan (1) and the closure pan (2).

16 Claims, 7 Drawing Sheets

CLOSURE UNIT FOR A CONTAINER HAVING A HINGED CONSTRUCTION, MADE OF DIFFERENT MATERIALS AND HAVING A FILM WHICH TEARS ON FIRST OPENING

The invention is in the field of the packaging industry and relates to a closure unit and a manufacturing process for the same, the closure unit comprising a substantially tubular pouring part and a closure part openably closing the pouring opening of the pouring part.

BACKGROUND OF THE INVENTION

For liquid containers, such as metal cans or coated cardboard receptacles for a resealable opening and easy pouring, use is often made of closure units, preferably made from plastic, and which comprise a pouring part with a pouring opening and a closure part closing the pouring opening of the pouring part and fitted in an opening of the container. Swiss patent application 2739/91-2 and 2740/91-9, PCT application No. WO 93/05945 and pending U.S. patent application Ser. No. 08/050,417, filed May 14, 1993, and based on the aforesaid PCT application all (application date 17.9.91) describe such closure units. The described closure units are molded in accordance with a multimaterial injection molding process and are made from at least two materials differing in at least one characteristic.

For easy handling in the case of the closure unit of application 2740/91, it is required that the closure unit in normal use is always connected to produce a single entity with the container in such a way that, even in the open state, the closure part cannot be completely removed from the pouring part. For fulfilling this requirement one or more flexible webs were proposed connecting the closure part in a flexible manner with the pouring part or shaped on the closure part and secured between the container and the pouring part. The disadvantage of this connection between the pouring part (or container) and the closure part is that the latter in the open state has no clearly defined position, so that a positioning movement is necessary prior to an effective closing movement to bring about a closure. As a function of the movement, the web is also deformed at different places on opening or closing. In order that the material should not be rapidly fatigued excessively as a result of these deformations and breaks, the material must either be very flexible or the web must be very thin. As the web is preferably made from the same material as the closure part and in particular its outer areas, a restriction of the material choice by the web requirements is undesired an da very thin web is not sufficiently tensionable.

Closure units molded from one material are also known which have connecting webs between the pouring part and the closure part. The closure unit is produced in the open state and closed before or after assembly on the container. The web connection has the same disadvantages as the connecting webs according to Swiss patent application 2740/91.

SUMMARY OF THE INVENTION

The object of the invention is to provide a closure unit, whose closure part, even in the open state, remains connected to the pouring part and, particularly, in a position precisely defined with respect to the pouring part in such a way that a single, simple closing movement is sufficient for closing the pouring opening. The permanent connection between the two parts of the closure unit, however, must be such that it brings about a minimum restriction of the material choice for the closure unit. The closure unit must still be manufactured in one working stage and fitted to the container also in one working stage.

Briefly, the closure unit has at least two areas each made from a different single material, the materials differing from each other with regard to at least one property or characteristic of materials. Furthermore, the pouring part and the closure part are held together by a hinge which has at least one bearing part shaped onto the pouring part and for each bearing part of the hinge there is a pivot part pivotally mounted in a bearing part and shaped on the closure part. The bearing part is made from a material which is different from the material from which that pivot part is made which is pivotably mounted in the respective bearing.

The closure unit of the invention has a hinge comprising at least one quasistationary bearing part, which is shaped on the pouring part, and at least one pivot part pivotally mounted on the bearing part and which is shaped onto the closure part. The bearing part and pivot part may form a pair of endless bearing surfaces in such a way that the hinge represents simultaneously a bearing means and a fastening means between the pouring part and the closure part. The pair of bearing surfaces may on the other hand not be endless but, instead open in such a way that the hinge cannot serve as fastening means. In such a case the closure part must be fastened to the pouring part by other means, for example by a material area which is flexible, consisting of a thin material film (film zone), and connects the closure part with the pouring part. Bearing part and pivot part may be, additionally, so shaped that one or more pivoting positions of the closure part relative to the pouring part are exactly defined. This means that the closure part, on opening the closure unit, moves to one of these defined positions if this is not prevented by special precautions.

The closure unit according to the invention is manufactured by a multimaterial injection molding process, the bearing part of the hinge being molded from one material and the pivot part from another material. As the surfaces molded together during multimaterial injection molding, these match one another very accurately and sealingly and as the closure unit with the hinge is produced in the closed state. At least in the closed state of the closure unit the hinge is so tight that the area of the hinge between the closure part and the pouring part does not necessarily need to be sealed by further sealing means or media, a feature which permits a very compact closure unit shape.

BRIEF DESCRIPTION OF THE DRAWINGS

Illustrative embodiments of the closure unit of the invention are described in greater detail with reference to the attached drawings, in which:

FIG. 8b: molding stage for material B);

DESCRIPTION OF THE ILLUSTRATED EMBODIMENTS

Figure 1:
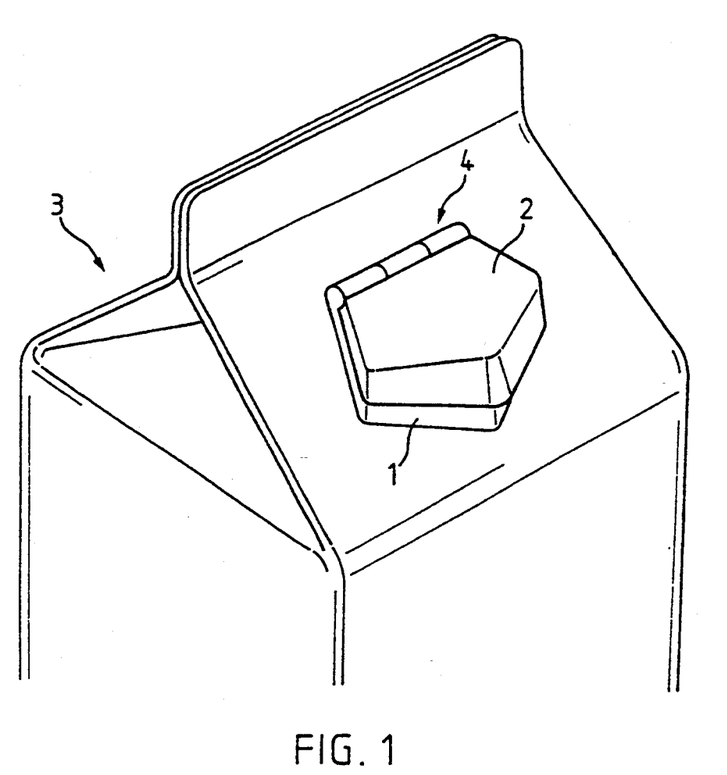
FIG. 1 is a diagrammatic perspective view of a just embodiment of the closure unit with hinge according to the invention.

FIG. 1 shows, in perspective an embodiment of the closure unit of the invention which comprises a pouring part 1 and a closure part 2. The represented closure unit is fitted to a coated cardboard container 3. The pouring opening (not visible in FIG. 1) and the closure part 2 are substantially pentagonal and one of the five sides has a hinge 4, with the aid of which the closure part 2 is affixed, in a limited pivotable manner, to the pouring part 1.

Figure 2A:
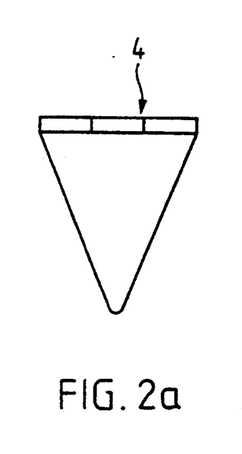
FIGS. 2a to 2c are diagrammatic plan views of several modifications of the closure parts of respective modifications of of the embodiment of FIG. 1.
Figure 2B:
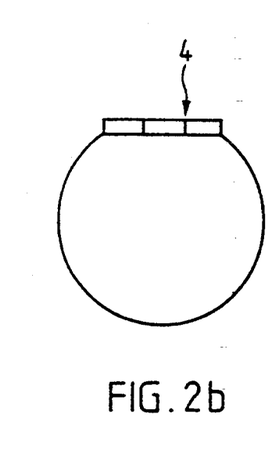
Figure 2C:
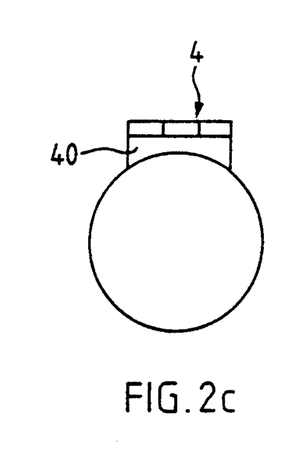

FIGS. 2a to 2c show diagrammatic plan views of three variant forms of contour of the closure part in other embodiments of closure units of the invention equipped with hinges 4. Compact closure units are possible if the hinge is directly adjacent to the pouring opening, in such a way that the hinge takes up at least part of the sealing necessary between the pouring part and the closure part 2. Such embodiments have an at least zonally linear limitation of the pouring opening, examples being shown in FIGS. 2a and 2b. If the pouring opening does not have a straight wall part, e.g. being circular in the manner shown in FIG. 2c, then the hinge can be fitted onto a suitably shaped bracket 40 on the pouring part.

Figure 3:
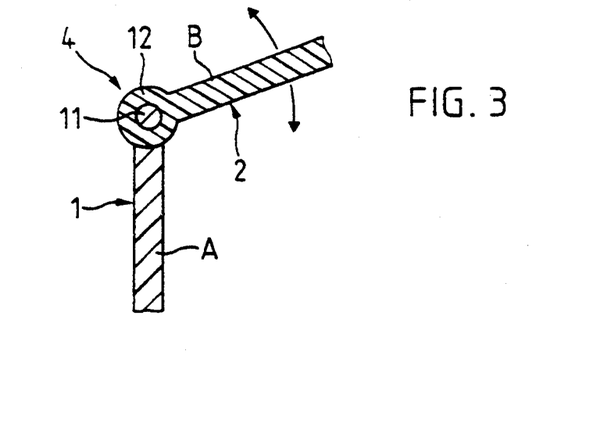
FIG. 3 is a section at right angles to the pivot axis of a hinge having a pair of endless bearing surfaces for connecting a closure part to a pouring part of a closure unit of the invention.
Figure 4A:
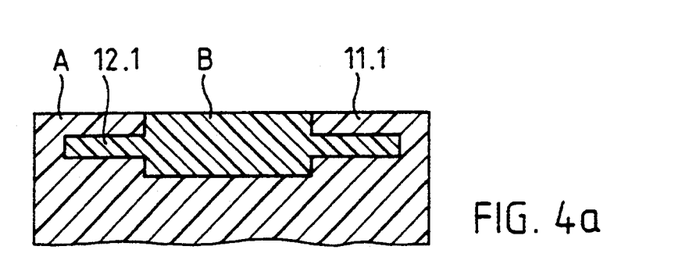
FIGS. 4a to 4c are sections along the pivot axis of different hinge variants of the hinge of FIG. 3 each with pairs of endless bearing surfaces.
Figure 4B:
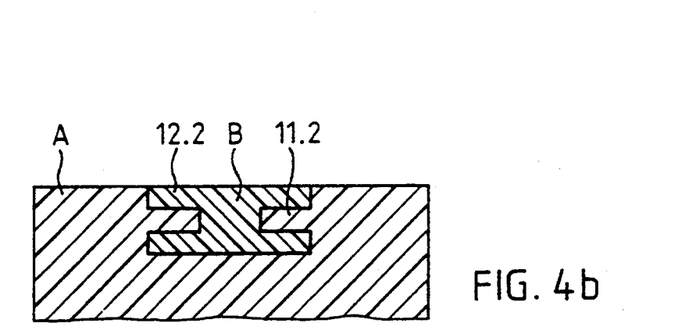
Figure 4C:
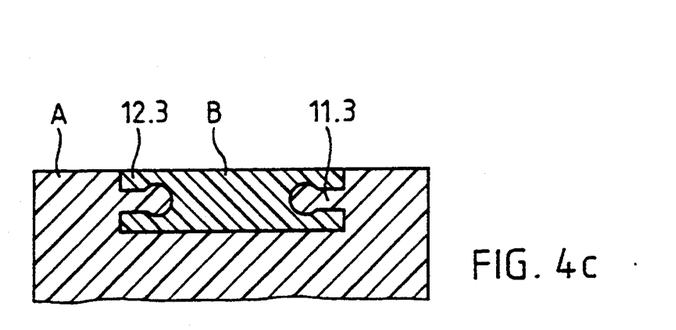

FIGS. 3 and 4a to 4c show sections through examples of hinges 4 with pairs of endless bearing surfaces for a closure unit according to FIGS. 1 or 2, the sections being at right angles to the pivot axis of the hinge in FIG. 3 or in a plane passing through the pivot axis in FIGS. 4a to 4c. The hinge has at least one bearing part 11, which is shaped on the pouring part 1, as well as a pivot part 12, which is shaped on the closure part 2, the bearing part and the pivot part forming a pair of bearing surfaces for a pivoting movement of the pivot part and therefore also of the closure part 2. The pair of bearing surfaces is endless, here with cylindrical surfaces, such that besides serving as a bearing, the bearing surfaces serve as connecting means between pouring part 1 and closure part 2.

The closure unit, as shown in FIGS. 3, 4a, 4b and 4c, comprises two materials A and B differing with regard to at least one characteristic or property of the material, in such a way that the bearing parts shaped onto the pouring part 1 are made from one material A, while the pivot parts shaped onto the closure part 2 are made from another material B. Bearing surfaces sliding on one another, therefore, are a surface made from the material A and a surface made from the material B. In the case of manufacture according to the multimaterial injection molding process a blank is molded from a material A, then the molds are at least partly interchanged and the finished part is molded by molding on another material B, the blank at least partly serving as the mold. The contact surfaces of the two materials resulting from the molding onto one another are—as a function of the choice of materials, the temperature control of the molding process and the geometrical shape—firmly interconnected and movable relative to one another. The bearing surfaces of the hinge must be movable against one another. The surfaces molded onto one another are superimposed in an accurate, sealing manner. These principles are utilized for the manufacture of the hinges for the closure unit of the invention.

The bearing parts are either conical (11.2 and 11.3) or sleeve-like (11.1). A pivot part is either sleeve-like (12.2 and 12.3) and embraces a conical bearing part, or is conical (12.1) and engages in a sleeve-like bearing part.

The conical bearing parts 11.3 of FIG. 4c have thickened portions and the sleeve-like pivot parts 12.3 have correspondingly shaped bearing surfaces. Such hinges cannot be pulled apart in the direction of the pivot axis. In the represented variants such a pulling apart is also prevented by the design of the bearing parts and consequently thickened portions of the conical parts merely provide additional security. Hinges with only one bearing part and only one pivot part are conceivable, however, which are only firmly held together by a corresponding thickened portion of the conical part.

The variants of FIGS. 4a to 4c all have two bearing parts and a double-sided pivot part. Other conceivable variants, for example, could have two pivot parts and a double-sided bearing part, and further variants could have double-sided pivot or bearing parts, or the same number of bearing parts and pivot parts, etc. For variants with few bearing or pivot parts the molds and the necessary movements, to remove these from the molded part, are simpler than for variants with more parts.

Even simpler molds are sufficient for molding closure units with hinges with open bearing surfaces. Such closure units and hinges are described in the following paragraphs.

FIG. 5 again shows an example of an embodiment of the closure unit of the invention with a pouring part 1, a closure part 2 and a hinge 4 pivotally interconnecting the closure part 2 and the pouring part 1. As above mentioned, the hinge has in this case one bearing part 21 shaped onto the pouring part 1 and one pivot part 22 shaped onto the closure part 2, wherein at least one of the bearing surfaces between the bearing part and the pivot part is not endless but open. Thus the pivot part 22 moves in the bearing part when the closure part is pivoted but only when the closure part is firmly attached to the pouring part by some other means. This other means is a narrow, flexible material area along the pivot axis Z, formed by a thin material film (film zone) which connects the pouring part and the closure part. Advantageously this film zone is arranged between two pairs of bearing and pivot part, as will now be explained with reference to FIG. 6 and FIG. 7.

The function of the film zone is the permanent interconnection of pouring and closure part. The function of the pairs of bearing and pivot part is the exact positioning of the pivot axis and the prevention of any action of undesired forces on the film zone, such as tensile or pression forces acting perpendicular to the pivoting axis, preventing additional loading of the film zone. In such a way it becomes possible to design and make the film zone very thin. During manufacturing the film zone may additionally be treated for improving its flexibility. In such a way a film zone of sufficient flexibility can be achieved without narrowing the choice of material in an undesired degree.

A further advantage of the closure unit with a film hinge (comprising at least one film zone and at least one pair of bearing/pivot parts) results from the fact that it can be molded with simple molds, especially there is no need for recesses. In other words, the closure unit of the invention can be molded with molds which are removed in only two directions.

Figure 5:
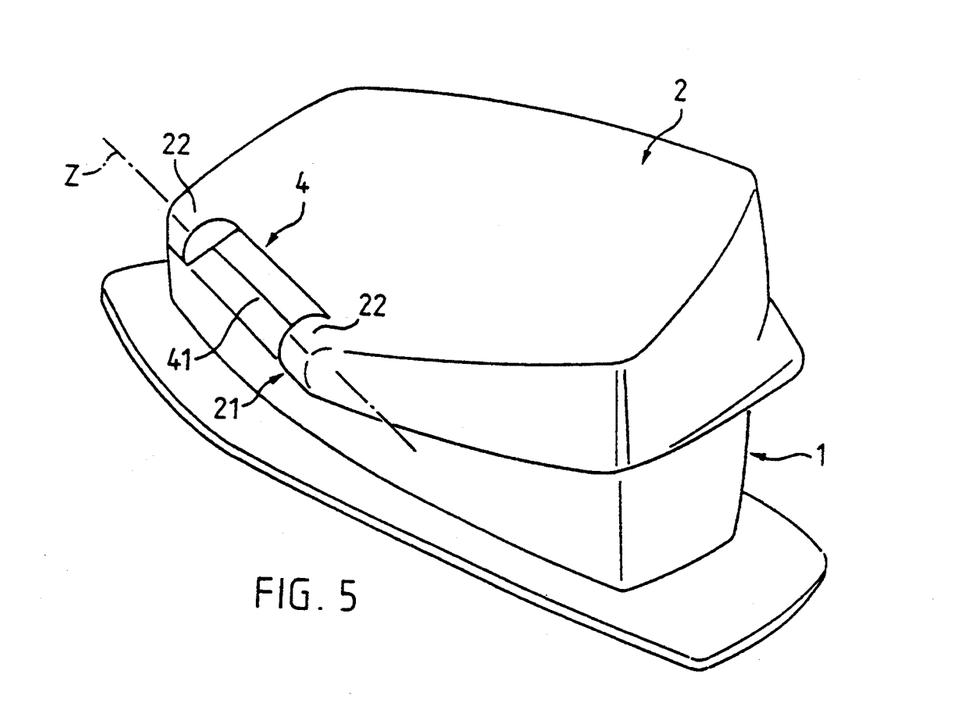
FIG. 5 is a perspective view of a second embodiment of a closure unit of the invention having an open bearing surface and a film zone.
Figure 6:
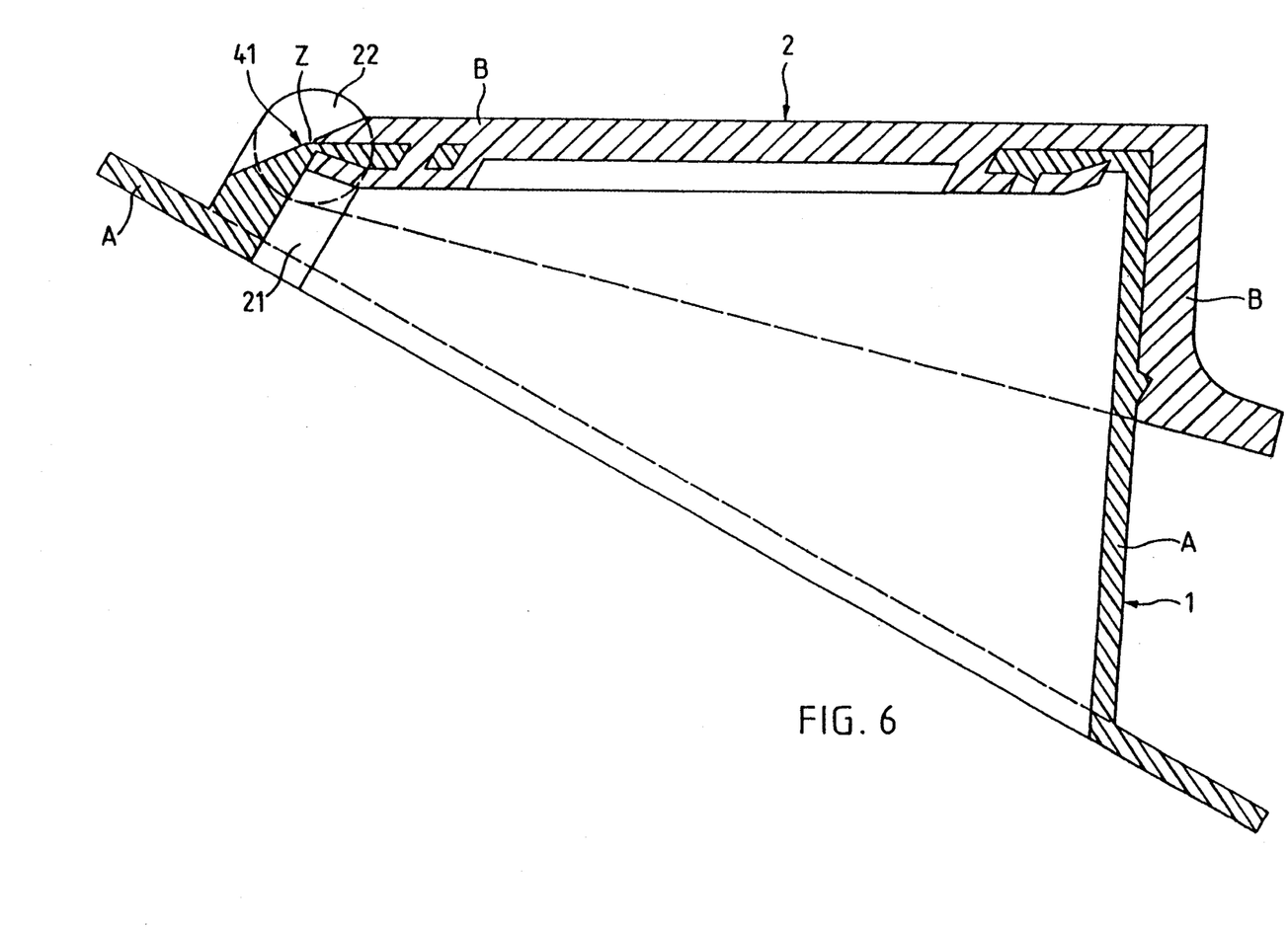
FIG. 6 is a section in the area of the film zone at right angles to the pivot axis through the closure unit shown in FIG. 5.

FIG. 6 shows a detailed sectional view of the closure unit of FIG. 5. The section is at right angles to the pivot axis Z, roughly in the center of the film zone 41, which is also shown in FIG. 5. The pouring part 1 essentially consists of a first material A. The body of the material A also extends into the closure part 2 and forms the film zone 41. The thin body formed from material A is internally and externally surrounded by a second material B in the closure part. The pivot parts 22 are made from the material B, while the bearing parts 21 are made from the material A. The pivot axis Z of the pivot part 22 passes through the film zone 41, which appears at the thinnest point in the cross-section of FIG. 6 of the body made from material A.

Figure 7:
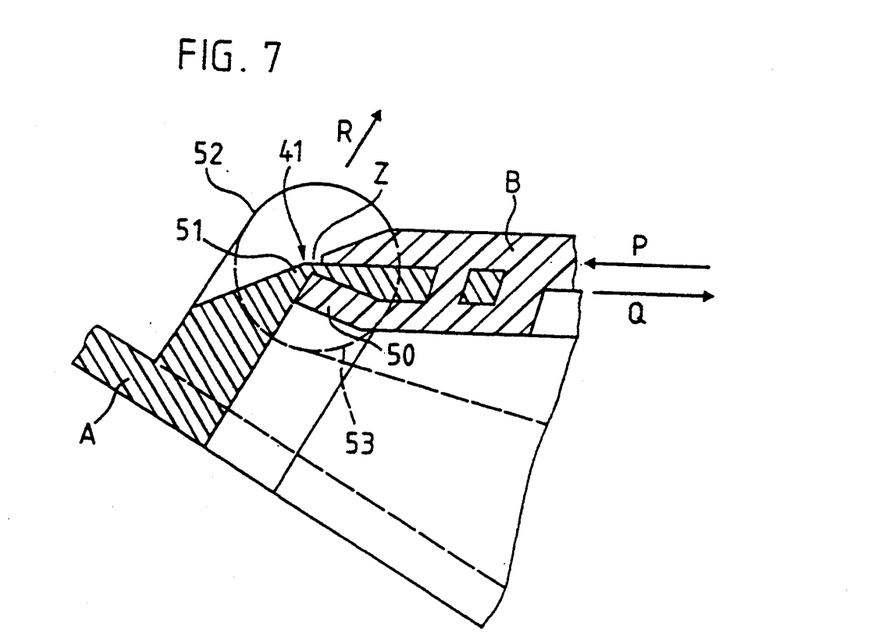
FIG. 7 is a detail of the hinge structure shown in FIG. 6.

FIG. 7 shows in the form of a larger scale detail the hinge zone of the closure unit according to FIG. 6. The film zone 41 is formed by a steep taper (zone 51) of the body made from material A which forms the pouring opening wall. Therefore the zones immediately alongside the film zone are stable and can absorb forces, which are not intended to act on the film zone. This is utilized in the illustrated embodiment: the body made from material B on the inside of the closure part is made as close as possible to the pivot axis Z (zone 50). Forces acting in the direction of the arrow P are transferred by the zone 50 of the body made from material B to the zone 51 of the wall of the pouring opening. They can consequently not deform the film zone 41. The pair of bearing surfaces between pivot part 22 and bearing part 21 also transfer forces of this type in the direction of arrow P if, on the outside of the hinge, the bearing part 21 extends far enough around the pivot part 22 (zone 52). Thus, for preventing forces in the direction of the arrow P on the film zone, the variant illustrated in FIG. 7 has two means, namely the zone 50 of the area of material B supported on the pouring opening wall and the bearing part zone 52 on the outside of the pivot part and surrounding the latter. Variants are obviously also conceivable, which only have one of these means, e.g. on which the zone 50 of the area from material B or the zone 52 of the bearing part preventing a movement of the closure part in the direction of the arrow P is missing.

Forces in the direction of the arrow Q likewise cannot have a deforming action on the hinge zone, because they are transferred via the pivot part 22 to the zone 53 of the bearing part 21. Forces acting parallel to the pivot axis Z on the closure part likewise cannot deform the hinge zone, because the pivot parts 22 are laterally positioned closely to the zone 51 of the pouring opening wall, so that no movement of the closure part in the direction of the pivot axis is possible. In order that the pairs of pivot/bearing part can also absorb forces at right angles to the pivot axis and away from the pouring part (arrow R), the bearing part 21 would have to extend in more than semicircular manner around the pivot part and be entirely closed.

The closure unit of the invention with a film hinge is produced by a multimaterial injection molding process. In a first stage a blank is molded from the material A, which essentially corresponds to the entire body in the finished unit which is made from the material A. In the next stage the molds are at least partly removed from the blank and replaced by other molds and then the material B is molded, the blank at least partly serving as the mold. It is possible to slightly deform the blank molded in the first stage with the mold for the second molding stage: during the movement of the mold pressure is exerted on the blank. As a result of such a pressure the structure of the molded, still warm material changes:—macromolecules are oriented, which leads, in the case of specific thermoplastics, to a flexibility increase, so that the risk of cracking during the use of the hinge is decreased. As a result of such a treatment the same effect is obtained as is obtained by a first closing process immediately following the molding of corresponding film hinges, which are molded from one material in the open state.

Figure 8A:
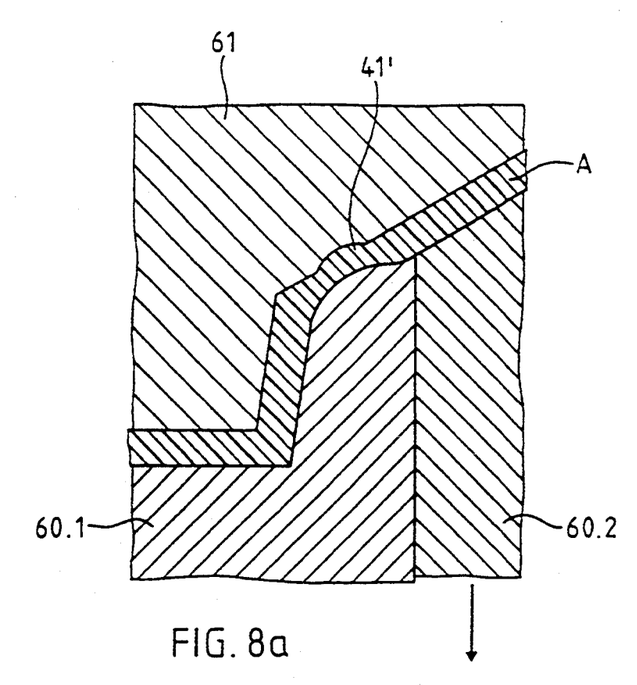
FIGS. 8a and 8b are cross-sectional sketches to illustrate the treatment of the film zone during production by a two-material injection molding process (FIG. 8a: molding stage for material A.
Figure 8B:
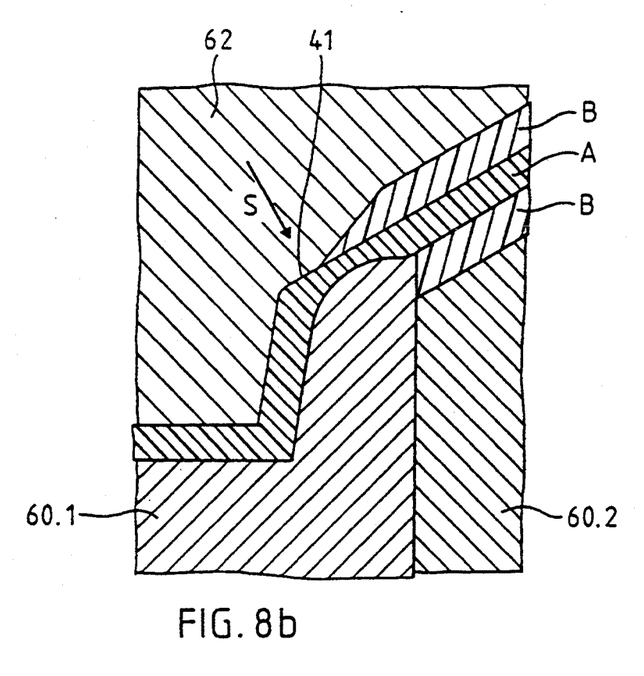

FIGS. 8a and 8b diagrammatically show the molding process for a closure unit of the invention in the vicinity of the film zone, which is pressure treated. FIG. 8a shows the blank immediately after the molding of the body made from material A between an inner mold 60.1 and 60.2 and an outer mold 61. The resulting film zone 41' does not correspond to the film zone of the finished product because it is slightly thicker. When the blank made from material A has sufficiently cooled, the molds are moved (60.2), removed (61) and either replaced by a new one (62) or left (60.1). Material B is then molded and the blank at least partly serves as the mold. If a particular zone of the blank is to undergo a pressure deformation, both sides of that zone cannot be molded round by material B. At least on one side of the zone to be treated the mold is replaced in such a way that the blank must be deformed between the two molds for the second molding stage. FIG. 8b shows the stationary mold 60.1 on the inside of the film zone and the new mold 62 on the outside of that zone which is shaped so that it does not correspond to the premolded film zone 41' and consequently exerts a deforming force thereon (arrow S).

Advantageously the thickness of the blank zone to undergo pressure treatment is reduced by approximately 20 to 40% by the mold of the second molding stage.

FIG. 8b shows that in this production process with deformation of the blank, a zone 50 (cf. FIG. 7) of the body B is not possible for the support of the closure part of the pouring opening wall. In such a case this function must be assured by a correspondingly shaped bearing part 21 (zone 52, FIG. 7).

Figure 9:
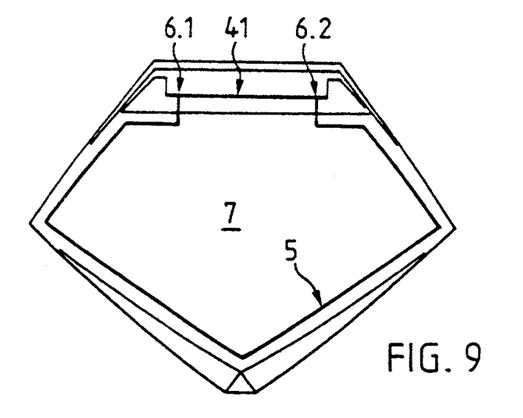
FIG. 9 is a closure unit according to FIG. 5 in a section in the plane of the film zone and the predetermined breaking point.

In Swiss application 2740/91 referred to earlier it is required, for additionally securing the new state of the closure unit, that at least one of the parts of the closure unit, which is made from one of the different materials, extends over the pouring part and the closure part and that such a part has a predetermined breaking point at least partly around the inner circumference of the pouring opening and which is broken during the first opening. FIG. 9 shows an embodiment of the closure unit which fulfills this requirement. The figure represents the closure unit in section parallel to the pouring opening 7. It has a film hinge with a film zone 41, which forms together with a predetermined breaking point 5 a closed line around the pouring opening 7. This means in other words that, when the closure unit is opened for the first time, a narrow area of material (predetermined breaking point 5) is destroyed up to a specific point (6.1 and 6.2), beyond this point a similar narrow area of material (film zone 41) is deformed only.

Predetermined breaking points cause no problems, if they extend from one edge of a single-material body to another edge thereof, or if they are closed. If they terminate in the interior of a single-material body, as in the present case, there is, at the end of the predetermined breaking point a zone (6.1 and 6.2) which is deformed, but not intended to break when the predetermined breaking point is broken open. There is always a risk in that zone, that as a result of the careless breaking of the predetermined breaking point, material immediately outside that point may be broken or is weakened by fine cracks and that such cracks may be further propagated into the material during further use.

In other uses holes are made at the end of predetermined breaking points. These holes prevent a further tearing from the predetermined breaking point into the material not belonging to the latter. However, this is not advantageous in the present case, because the material body extending from the pouring part into the closure part must also fulfil a sealing function between the two parts of the closure unit.

Between the film zone 41 and the predetermined breaking point 5, both of which represent narrow and thin material zones, there are provided wider thin material zones, which can be treated during the production process for additional elasticity and flexibility. The two predetermined breaking point end zones (6.1 and 6.2) form, during the breaking open of the breaking point, the end points thereof and the angle points for the pivoting movement of the closure part. They are deformed when breaking open the predetermined breaking point, but do not tear. Thus, they serve as buffer zones between the moved zones of the predetermined breaking point 5 and the immediate vicinity thereof and the material zones not to be influenced by the predetermined breaking point. The predetermined breaking point end zones are flat, thin and, if necessary, treated for increased elasticity and flexibility.

Figure 10:
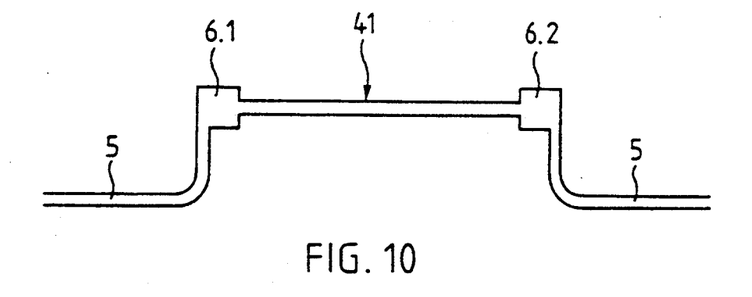
FIG. 10 is a detail view of part of FIG. 9 showing the predetermined breaking point, the breaking point end zones and the film zone.

FIG. 10 shows on a larger scale the predetermined breaking point end zones 6.1 and 6.2 between the film zone 41 and the predetermined breaking point 5. During the breaking open of the predetermined breaking point and during any following opening or closing procedure of the closure unit, the predetermined breaking point end zones are deformed, but are scarcely torn due to their high flexibility and elasticity and serve as buffer zones for cracks tearing out of the predetermined breaking point.

The predetermined breaking point end zones of the closure unit of the invention advantageously measure, across their surface, 0.1 to 1.5 mm and have a thickness of 0.05 to 0.3 mm. They can have a random shape, but it is advantageous to avoid sharp corners.

The predetermined breaking point end zones are, during the manufacture of the closure unit, molded and then pressed, so that the structure of the plastic changes, because the macromolecules are reoriented compared with the molded state. This process corresponds with the process already described for the treatment of the film zone. The molding gap for the first molding stage in the vicinity of the predetermined breaking point end zones can be up to approximately 40% wider than for the second molding stage, so that the material thickness in these zones is reduced by the mold pressing effect for the second stage by up to 40%.

Figure 11A:
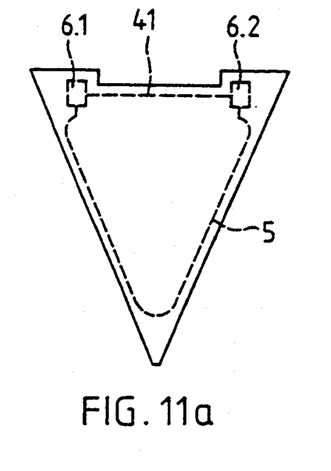
FIG. 11a and 11b are plan views of two modifications of FIG. 9 showing film zones and predetermined breaking points.
Figure 11B:
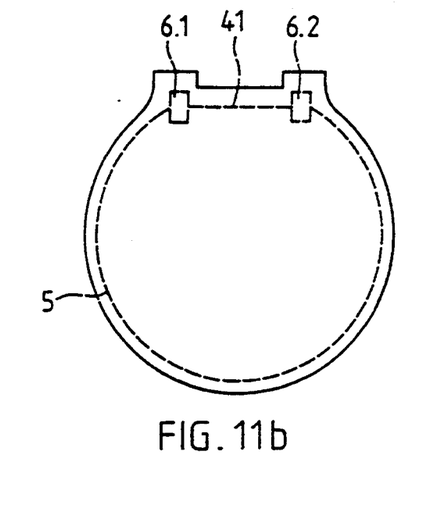

FIGS. 11a and 11b diagrammatically show in plan view of the closure part two further variants of the closure unit of the invention, having a film zone 41, a predetermined breaking point 5 and intermediate predetermined breaking point end zones 6.1 and 6.2.

FIG. 12 and 13a to 13f show details of closure units according to the invention whose hinges are so constructed that specific pivoting positions of the closure part are defined. This means that the closure part is brought into a precisely defined open position (or one of several such defined positions), independently of the forces acting during opening, so as to permit good pouring and a simple closing process. For this reason the closure unit has interlocking means in the area of the hinge which maintain the closure part in such a pivoting position and offer an elastic resistance to the pivoting of the closure part out of that position. Therefore the force necessary for pivoting is dependent on the instantaneous pivoting position and the pivoting direction, that is, it is greater for example if the closure part is moved away from the defined pivoting position than when moved towards it. The interlocking means can also be designed so that elastic forces automatically help to move the closure part at least from its initial vicinity into the defined position.

Figures 12, 13A:
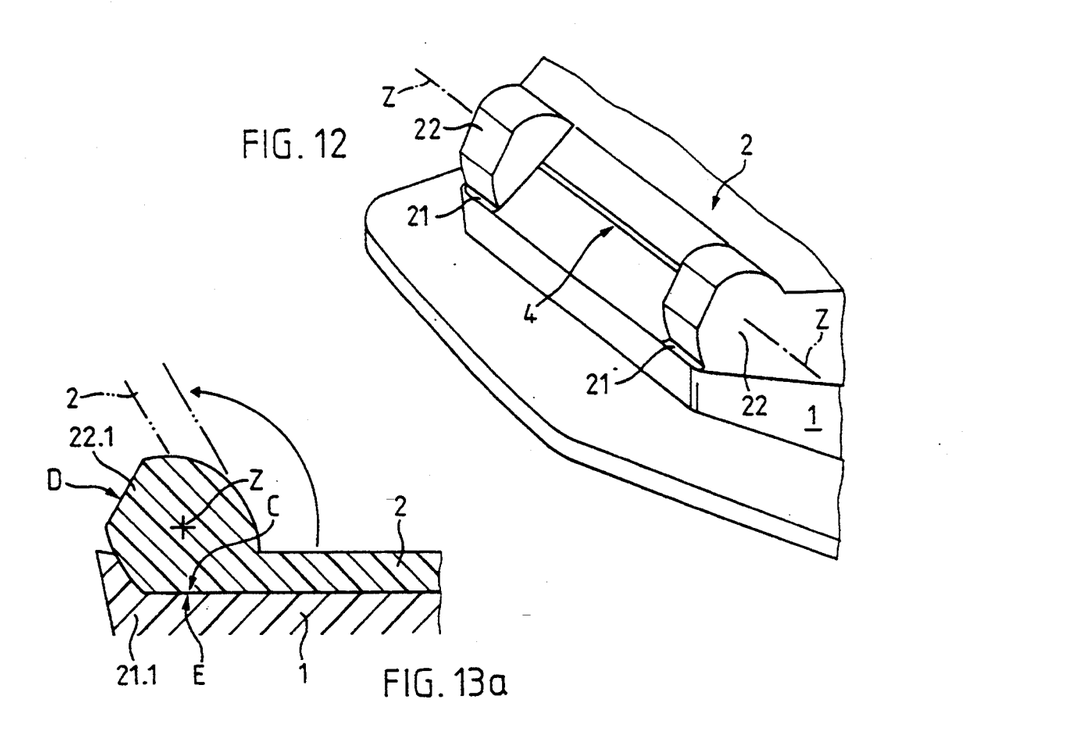
FIG. 12 is a perspective view of the hinge portion of a closure unit having a film zone and an open bearing surface and means for defining specific pivoting positions.
FIGS. 13a to 13f are cross-sections of alternative hinge constructions with interlocking means for defining specific pivoting positions.

FIG. 12 shows an embodiment of a closure unit with a film hinge 4, interconnecting in a limited pivotable manner the pouring part 1 and closure part 2. For defining at least one pivoting position (the or an? open position of the closure part), the pivot parts 22 and the bearing parts 21 are equipped with interlocking means so that the pivoting of the closure part not only has to be performed against the resistance of the friction of the bearing surfaces moving against one another, but also against a self-closure resistance. The defining of a specific opening position can also be used to prevent an excessive wide opening of the hinge, which could lead to an overstretching of the film zone.

In order to obtain such a self-closure resistance, the pairs of bearing surfaces between pivot part 22 and bearing part 21 are not rotationally symmetrical to the pivot axis Z. This asymmetry must only represent the amount by which the parts can be elastically deformed, so that the self-closure resistance keeping the closure part in the defined pivoting position can still be overcome with a corresponding force expenditure without harming the hinge. Self-closure resistance means for defining pivoting position advantageously comprise corresponding planar areas in the surfaces which move on one another during the pivoting movement. Such self-closure means are conceivable either on closure units with film zone and open bearing surfaces (FIG. 12) or on closure units with hinges with closed bearing surfaces.

FIGS. 13a to 13f show in a section at right angles to the pivot axis, hinges with self-closure resistance means. FIG. 13a shows the self-closure means diagrammatically indicated in FIG. 12. The bearing surface of the pivot part 22.1 has two non-rotationally symmetrical points C and D, while the bearing surface of the bearing part 221.1 has a point E corresponding to those points. The pivot part 22.1 shaped on the closure part 2 consequently has two defined pivoting positions, one when point C is located on the point E (continuous line pivoting position of pivot part and closure part) and the other when the point D is located on the point E (dot-dash line pivoting position of closure part). These two pivoting positions can represent the closed position and an open position which is appropriate for easy pouring with respect to the closure part.

Figure 13B:
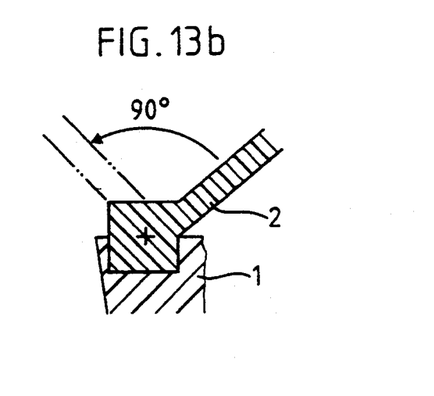
Figure 13C:
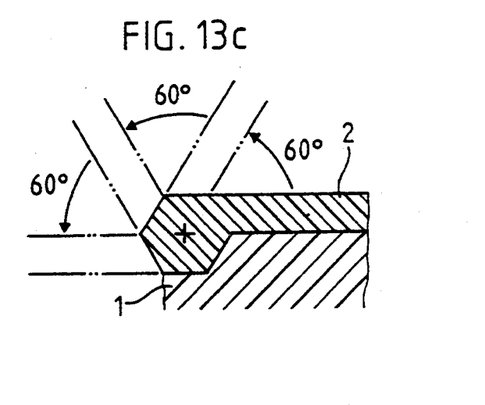
Figure 13D:
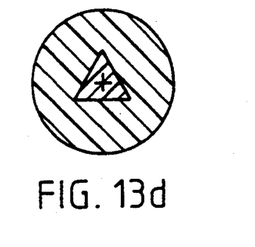
Figure 13E:
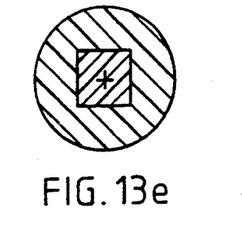
Figure 13F:
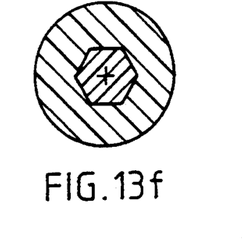

FIGS. 13b and 13c show further corresponding embodiments of film hinges provided with interlocking means (self-closure resistance means). The hinge according to FIG. 13b has two defined pivoting positions with an intermediate angle of 90° and the hinge according to FIG. 13c four defined pivoting positions with intermediate angles of in each case 60°. FIGS. 13d to 13f show corresponding interlocking means for hinges with pivot/bearing part pairs with closed bearing surfaces, where the embodiment according to FIG. 13d, as a function of the pivoting range, has up to three defined pivoting positions, the embodiment of FIG. 13e up to four such positions and that according to FIG. 13f up to six such positions. Obviously, besides the illustrated embodiments, it is possible to conceive embodiments with bearing surfaces which are in part planar and in part curved in a rotationally symmetrical manner.

I claim:

1. Closure unit made from thermoplastic synthetic material, for a container for handling and storing flowable products, comprising:
    a substantially tubular pouring part (1) having:
        a lower opening for fitting to an opening of a container; and
        an upper edge portion defining an upper opening for use in pouring; and
    a closure part (2) closing said upper opening of said pouring part (1);
    said closure unit having at least two areas, each area being made from respective different single materials, wherein the single material of one area differs from the single material of another area in at least one characteristic;
    a hinge (4) pivotally connecting the closure part (2) to the pouring part (1), the hinge (4) having:
        at least one bearing part (11, 21) formed on the pouring part (1); and
        for each bearing part, the hinge further having a pivot part (12, 22) pivotally coupled to a corresponding bearing part (11, 21) and formed on the closure part (2);
        the bearing part (11, 21) being made from one of said single materials, and the pivot part (12, 22) being made from another of said single materials;
    wherein the hinge (4) forms part of a boundary of said upper edge portion of said upper opening of said pouring part (1) and including flexible member (41) adjacent said bearing and pivot parts and connected between said closure part and pouring part for providing a liquid tight seal therebetween; and
    said pouring part having a substantially linearly directed wall area at the upper edge portion which defines said upper opening of said pouring part.

2. Closure unit according to claim 1, wherein the hinge (4) is formed on a bracket (40) which upwardly extends said upper opening of said pouring part and which at least partly defines a shape of said upper opening of said pouring part.

3. Closure unit according to claim 1, wherein the bearing part (11.2, 11.3) is conical and i surrounded in a sleeve-like manner by the pivot part (12.2, 12.3), such that the bearing part and pivot part together form a pair of endless bearing surfaces.

4. Closure unit according to claim 1, wherein the pivot part (2.1) is conical, and the bearing part (11.1) surrounds in sleeve-like manner the conical pivot part (12.1), such that the bearing part and pivot part together form a pair of endless bearing surfaces.

5. Closure unit according to claim 1, wherein the conical part has a thickened portion, and the sleeve-like bearing part has a corresponding widened portion.

6. Closure unit according to claim 1, wherein the hinge (4) further comprises at least one double-sided bearing part.

7. Closure unit according to claim 1, wherein the hinge (4) further comprises at least one double-sided pivot part.

8. Closure unit according to claim 1, wherein the hinge (4) further comprises at least one double-sided bearing part and at least one double-sided pivot part.

9. Closure unit, made from thermoplastic synthetic material, for a container for handling and storing flowable products, comprising:
    a substantially tubular pouring part (1) having:
        a lower opening for fitting to an opening of a container; and
        an upper opening for use in pouring; and
    a closure part (2) closing said upper opening of said pouring part (1);
    said closure unit having at least two areas, each area being made from respective different single material, wherein the single materials of one area differs from the single material of another area in at least one characteristic;
    a hinge (4) pivotally connecting the closure part (2) to the pouring part (1), the hinge (4) having:
        two bearing parts (11, 21) formed on the pouring part (1); and
        two pivot parts (12, 22) formed on the closure part (2), each pivot part (12, 22) being pivotally coupled to a corresponding bearing part (11, 21) to form respective pairs of bearing and pivot parts;
        said respective pairs of bearing and pivot parts being spaced apart from each other;
        the bearing parts (11, 21) being made from one of said single materials, and the pivot parts (12, 22) being made from another of said single materials; and
    a film zone (41) pivotally interconnecting said closure part (2) with said pouring part (1), and said film zone being provided in a space between said spaced apart pairs of bearing and pivot parts; and
    wherein the pivot parts of said respective pairs of bearing and pivot parts are pivotable around a common pivot axis (Z) passing through said film zone (41).

10. Closure unit according to claim 9, wherein the hinge (4) forms a part of a boundary of an upper portion of said upper opening of said pouring part, said upper opening of said pouring part having a substantially linearly directed wall area.

11. Closure unit according to claim 9, wherein said bearing parts of the pairs of bearing and pivot parts have open bearing surfaces between a said pivot part (22) and its associated bearing part (21).

12. Closure unit according to claim 9, wherein the material of said film zone (41) has a structure which is varied by different pressures applied thereto during a molding process, as compared with other zones of the same material.

13. Closure unit according to claim 9, wherein at least one area of one of said single materials (A) extends at least into region of the upper opening of said pouring part and also around said lower opening of said pouring part (1), and said at least one area communicating with an opening of said closure part (2) and forming, between said pouring and closure parts, in the region of said hinge, a narrow, thin zone of which a part serves as said film zone (41) and another part serves as a predetermined breaking point (5).

14. Closure unit according to claim 13, wherein between the film zone (41) and the predetermined breaking point (5) there are predetermined breaking point end zones (6.1 and 6.2) in the form of flat extensions of zones of a thin body of one said single materials.

15. Closure unit according to claim 14, characterized in that the predetermined breaking point end zones (6.1 and 6.2) measure across their surface 0.1 to 1.5 mm.

16. Closure unit according to claim 10, wherein said single material in the predetermined breaking point end zones (6.1, 6.2) has a higher degree of flexibility than other zones of the same single material.

* * * * *